Feb. 1, 1938.  G. F. BAHR  2,106,992
SPLASH GUARD
Filed Oct. 12, 1936
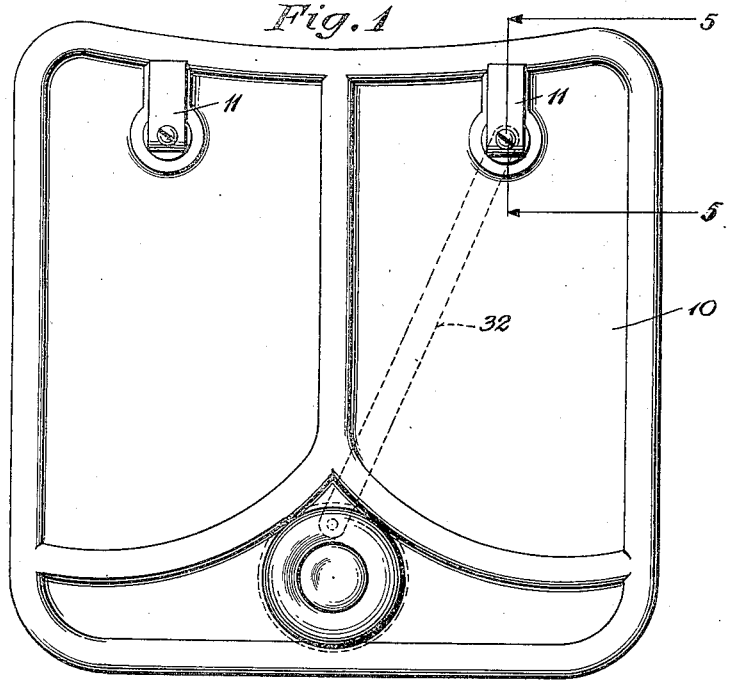
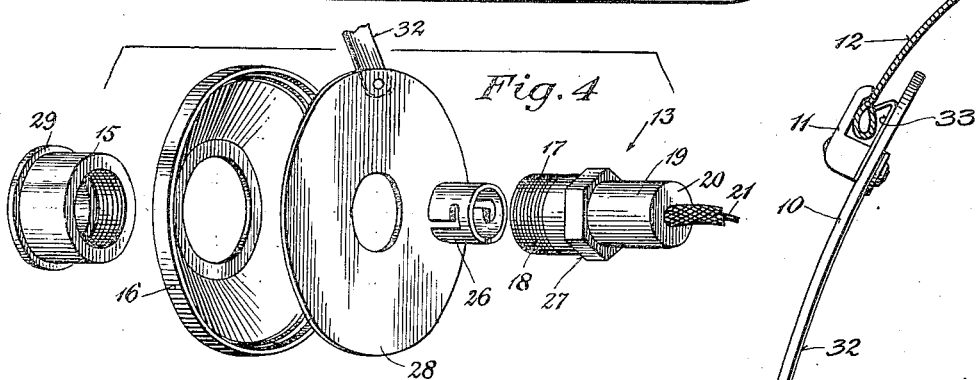
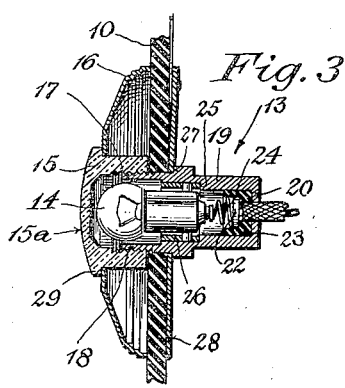
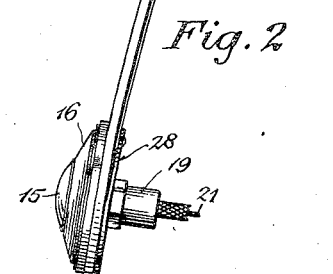
INVENTOR.
Gustave F. Bahr,
BY
ATTORNEY Patented Feb. 1, 1938

2,106,992

UNITED STATES PATENT OFFICE 2,106,992

SPLASH GUARD

Gustave F. Bahr, Fairfield, Conn., assignor to Casco Products Corporation, Bridgeport, Conn., a corporation of Connecticut Application October 12, 1936, Serial No. 105,164

6 Claims. (Cl. 240—8.1)

This invention relates to splash guards, as for motor vehicles and the like.

At the present time, motor vehicles, especially passenger automobiles, are often seen on the road at night with taillights out-of-order. Such a condition is particularly dangerous to drivers of vehicles approaching from the rear, and especially so, if such approach be around a curve, since then the headlights of the approaching vehicle do not follow the road, and do not reveal in good time the dark car ahead.

It is an object of the present invention to obviate this danger which arises due to failure of the taillight to operate properly, by providing an improved automobile splash guard carrying a separate and reliable source of illumination to function in conjunction with the usual taillight. This improved splash guard thus serves as an auxiliary to give notice of the presence of a car should its usual taillight fail to function.

The light carried by the splash guard is simple and rugged in construction, and has no reflectors or large lens parts. Therefore it will not get out-of-order easily. In addition, its location on the splash guard makes it easily accessible, so that repairs and replacement of the bulb may be simply effected. The light is constructed entirely of unbreakable parts, and extremely rugged features which make for reliability which is important in a light serving as an auxiliary to the taillight.

Also, when an automobile carrying the improved illuminated splash guard is in motion, the light carried by said guard will sway and gyrate to some extent, and thus attract the attention of motorists approaching from the rear much more quickly than would the ordinary taillight.

Furthermore, when an automobile is equipped with a pair of these splash guards, the width of the car will become defined to drivers in the rear, and this fact will further increase the safety of night driving.

Other features and advantages will hereinafter appear.

In the accompanying drawing, which shows one embodiment of the invention:

Figure 1 is a rear elevation of the improved illuminated splash guard.

Fig. 2 is a side elevation showing the guard attached to the rear bead of a rear automobile fender.

Fig. 3 is a section taken axially through the illuminating device of the guard.

Fig. 4 is an exploded view of the illuminating device.

Fig. 5 is a detail section of one of the attaching fixtures secured to the apron, taken on the line 5—5 of Fig. 1.

As shown in Figs. 1 and 2, the present invention is applied to a splash guard comprising a flexible apron 10 having attached thereto a pair of clamps 11 and adapted to grip the lower rear edge or bead of an automobile fender 12.

According to the invention, the lower portion of the apron, near the center, is provided with an illuminating translating device, which, in the embodiment shown, comprises an electric socket 13 and a bulb 14, a combined lens and nut 15 securing the socket to the apron, and an escutcheon plate 16 mounted on the apron by means of the nut 15.

The socket 13 comprises an outer metal shell 17 which is substantially tubular in shape, having its neck externally threaded, as at 18, and having a rear barrel portion 19 terminating in a centrally apertured end wall 20. A connecting wire 21 passes through the aperture in the wall 20, and is soldered to a small metal disk 22 carried in an insulating cup 23 within the barrel 19, and closely fitted to the internal bore thereof. The cup 23 also carries a conical compression spring 24, the base of which contacts the metal disk 22.

The bore of the shell 17 is stepped to provide a shoulder 25 for locating a split sleeve 26 having a pair of bayonet slots therein, said sleeve being press-fitted in place and adapted to receive and hold the pin-equipped base of the bulb 14. When the bulb 14 is inserted in the sleeve 26 the central tip of said bulb will engage and contact with the spring 24, causing the latter to be slightly compressed, thus locking the bulb in place.

For the purpose of mounting the shell on the apron 10, the shell has an external shoulder 27 adapted to engage the apron. The shell 17 preferably carries a circular metal plate 28 for the purpose of making electrical connection to the socket. The threaded neck 18 of the shell passes through an aperture in the apron 10, said neck having screwed thereon the combined nut and lens 15 which, when brought up tight, securely holds the shell to the apron 10, and draws the circular plate 28 against the back of said apron.

Preferably, the nut 15 is molded of a translucent thermoplastic material, so that light from the bulb 14 will illuminate the front lens portion 15a of the nut and pass therethrough. In order to properly and securely position the socket on the apron, and also for purposes of ornamenta-